July 9, 1935.　　　　M. A. SMITH, JR　　　　2,007,506
PROPELLER
Filed April 6, 1932　　　3 Sheets-Sheet 1

INVENTOR.
MARSHALL A. SMITH Jr
BY
ATTORNEY

July 9, 1935.  M. A. SMITH, JR  2,007,506
PROPELLER
Filed April 6, 1932   3 Sheets-Sheet 2

INVENTOR
MARSHALL A. SMITH, JR
BY
ATTORNEY

July 9, 1935.  M. A. SMITH, JR  2,007,506
PROPELLER
Filed April 6, 1932  3 Sheets-Sheet 3
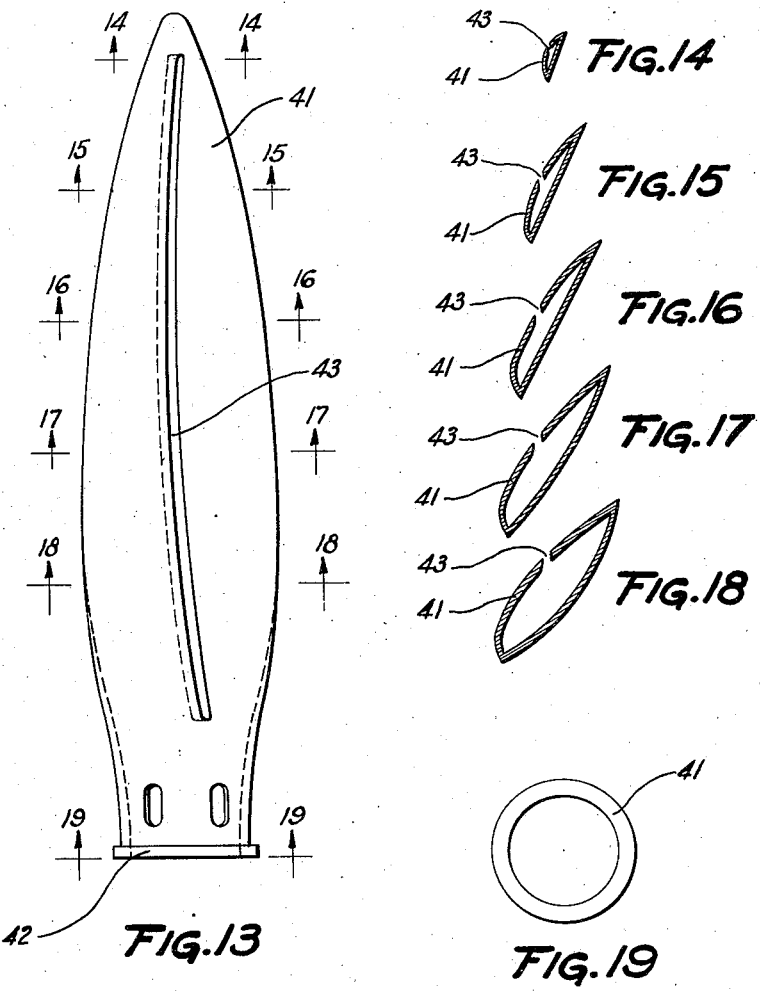

Patented July 9, 1935

2,007,506

UNITED STATES PATENT OFFICE 2,007,506

PROPELLER

Marshall A. Smith, Jr., South Bend, Ind., assignor to Bendix Aviation Corporation, South Bend, Ind., a corporation of Delaware Application April 6, 1932, Serial No. 603,640

4 Claims. (Cl. 170—172)

This invention relates to ventilating fans and to fan blades.

When an airfoil is moved relative to the air and when the chord of the airfoil is set at a positive angle to the direction of motion, the relative motion sets up a movement of air away from the thrust-face due to the "lift" which is caused by a positive pressure on the thrust-face of the airfoil and a negative pressure or vacuum on the curved or camber face of the airfoil.

It has been found that approximately one-third of the total "lift" of an airfoil section is due to the positive pressure on the thrust-face and that approximately two-thirds of the "lift" is due to the negative pressure on the camber side of the airfoil. It has further been discovered that the value of the negative pressure depends upon the smoothness and regularity of the flow of air over the camber face of the airfoil. It has also been found that at high angles of attack (i. e. the angles at which the chord line of the section is set with reference to the line of motion of the airfoil) that the flow of air over the camber face of the airfoil becomes turbulent and irregular with resulting loss in lift.

I have found that by allowing a relatively small amount of air to flow through a properly shaped slot in a blade for a ventilating fan from the thrust-face of the fan (i. e. positive pressure face) to the camber face (i. e. negative pressure face) the flow of air over the camber face is made smooth and regular at relatively high angles of attack with a resulting increase of lift and a consequent resulting increase in the amount of air moved.

I have further found that by causing a small amount of air to be discharged from the camber face of the fan blade rearwardly of the blade, the turbulence and irregularity of the flow of air over the camber face may be substantially eliminated with a resulting increase in the efficiency of the fan in moving air.

One of the objects of the invention is to accordingly increase the efficiency of ventilating fans.

A further object of the invention is to provide a fan structure so constructed as to substantially eliminate turbulence and to promote smoothness in the flow of air or other gases across the camber face of the fan blades.

Further objects of the invention will be apparent after a reading of the subjoined specification when taken in connection with the attached drawings in which:

Fig. 13 is a plan view of a modified form of blade;

Fig. 14 is a section taken along the line of 14—14 of Fig. 13;

Fig. 15 is a section taken along the line 15—15 of Fig. 13;

Fig. 16 is a section taken along the line 16—16 of Fig. 13;

Fig. 17 is a section taken along the line 17—17 of Fig. 13;

Fig. 18 is a section taken along the line 18—18 of Fig. 13;

Fig. 19 is a view taken on the line 19—19 of Fig. 13.

Figure 1:
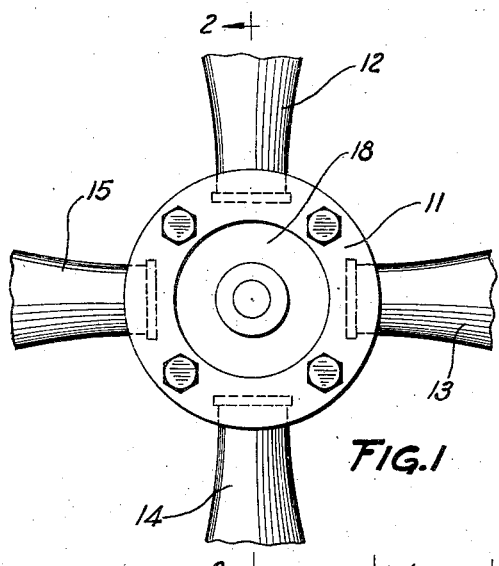
Fig. 1 is a view in front elevation of a hub and a portion of the fan blades attached thereto.
Figure 2:
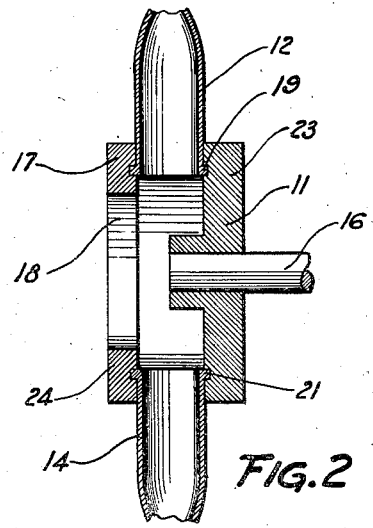
Fig. 2 is a section taken along the line 2—2 of Fig. 1.
Figure 3:
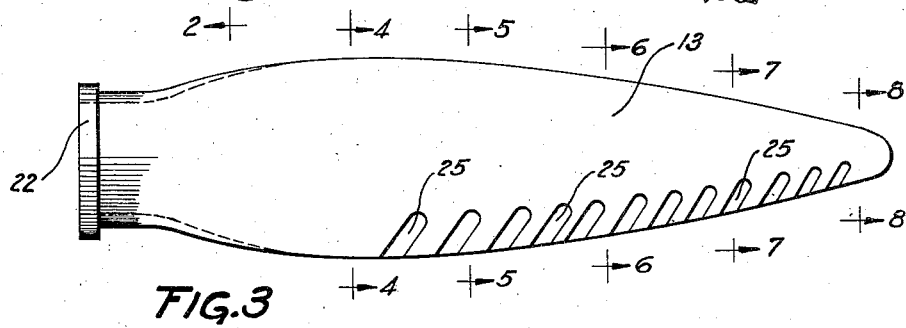
Fig. 3 is a plan view of one of the blades.
Figures 4, 5, 6, 7, 8:
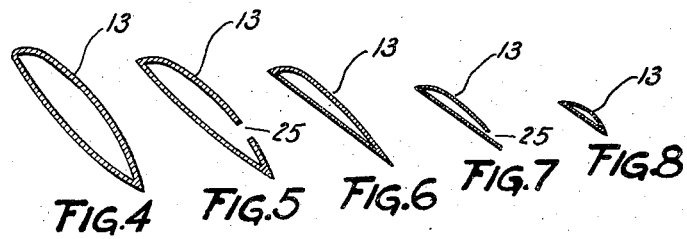
Fig. 4 is a section taken along the line 4—4 of Fig. 3.
Fig. 5 is a section taken along the line 5—5 of Fig. 3.
Fig. 6 is a section taken along the line 6—6 of Fig. 3.
Fig. 7 is a section taken along the line 7—7 of Fig. 3.
Fig. 8 is a section taken along the line 8—8 of Fig. 3.

Referring in particular to the drawings, there is shown, in Figs. 1 and 2, a fan including a hub 11 in which are mounted hollow fan blades such as 12, 13, 14 and 15. The hub is driven by a suitable shaft 16 and has its forward face 17 formed with an opening 18 through which air or gas may enter the hub and thereafter pass outwardly through the hollow blades. The hub is formed with sockets for the blades 12, 13, 14 and 15 as shown in Fig. 2. Each of the blades has its butt end formed with a flange such as flange 22, the flanges adapted to be received in the sockets. The hub is preferably formed in two halves 23 and 24 which are adapted to be clamped together in any suitable manner after the insertion of the blades. As illustrated in Fig. 3, each of the blades is formed with a plurality of discharge openings, such as 25, along their trailing edges, through which openings air drawn into the open end of the hub may escape from the blades.

Figure 9:
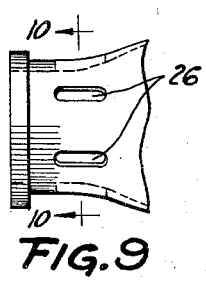
Fig. 9 is a fragmentary view showing a modified form of the hub for the fan blades.
Figure 10:
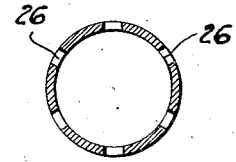
Fig. 10 is a section taken along the line 10—10 of Fig. 9.

In a modified form shown in Figs. 9 and 10, the hub is formed with its forward face closed and air enters the front of the blades through openings 26 formed in each blade adjacent to the hub, passing outward through the hollow blades and rearward as described above in connection with Figs. 1-8 inclusive.

Figures 11, 12:
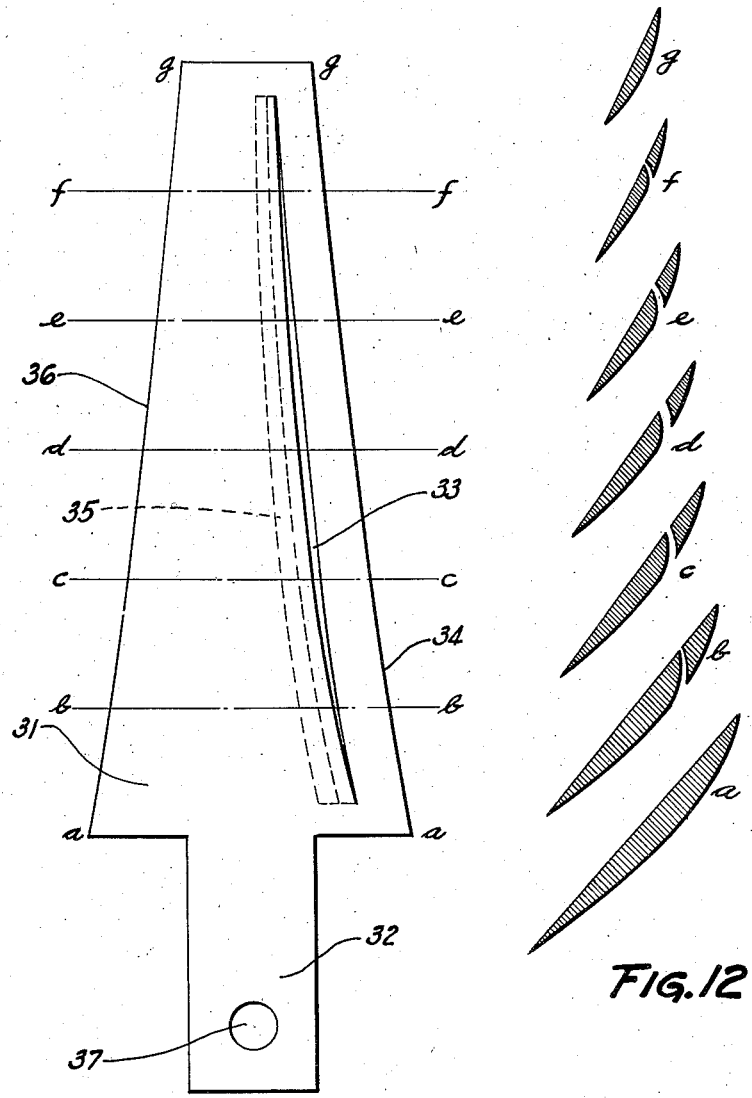
Fig. 11 shows a plan view of a slotted blade suitable for use on a blower or ventilating fan and adapted to promote smoothness of air flow in a modified manner.
Fig. 12 shows the blade of Fig. 11 in cross section at various points along the blade.

Referring to Figs. 11 and 12 of the drawings, it may be seen that I have shown a ventilating fan blade 31 adapted to be secured to a hub, as by its butt 32, and formed with a slot 33, the slot having its opening on the thrust face adjacent to the leading edge 34 and having its opening on the camber or rear face, as shown by dotted lines at 15. The butt 32 of the blade is provided with a hub hole 37 to facilitate the connection of the blade with the hub. Sections of the blade taken along the lines aa, bb, cc, dd, ee, ff, and gg of Fig. 11 are shown respectively at a, b, c, d, e, f, and g, of Fig. 12.

It may be noted that the blade angle decreases along its span from the hub toward the tip and that the slot is not formed throughout the length of the blade but extends from a point adjacent to the hub to a point adjacent to the tip.

Referring to Figs. 13-19 inclusive of the drawings, it may be seen that I have shown a ventilating fan blade 41 adapted to be secured to a hub by a butt flange 42. The blade 41 is hollow throughout its length and thus a passageway is provided for air which may be drawn in through the forward face of the hub as described above in connection with Figs. 1-3 inclusive and forced out toward the tip of the blade and thence through the discharge opening formed by the longitudinal slot 43. This slot is preferably positioned just back of the maximum ordinate of the section and the most efficient position therefore is within the lines of the 50-70 percent of the chord back from the leading edge of the blade and on the camber face thereof.

It is to be understood that the above described embodiments of the invention are for the purpose of illustration only and various changes may be made therein without departing from the spirit and scope of the invention.

What is claimed is:

1. A fan blade for an impeller having an airfoil section and thrust and cambered faces, said blade being solid and being formed with a longitudinally-extending slot therethrough so that air directed toward the thrust face of the blade may pass through said slot to the cambered face thereof, said slot being of substantial length and of varying width throughout and being widest substantially at a point midway of the length of the blade and having a substantially narrow portion adjacent the tip thereof.

2. A fan blade having a longitudinally-disposed opening therein, said opening being of varying cross section and having a maximum cross section at a point approximately midway of the length of the blade and positioned from 50% to 70% toward the trailing edge on the upstream face of the blade, said opening having a minimum cross section adjacent the tip of the blade.

3. A fan blade for a fan adapted for use in an atmospheric medium, said blade having an airfoil section including a camber and a thrust face, the effective portion of the latter face being flat and included in a single plane, said blade being provided in at least one of its faces with an opening of varying cross section, widest at a point substantially midway of the length of the blade and narrowest adjacent the tip of the blade.

4. A hollow fan blade for a fan adapted for use in an atmospheric medium, said blade having an airfoil section including a camber and a thrust face, the effective entire portion of the latter face being flat and included in a single plane, said blade being provided in said camber face with an opening of varying cross section, widest at a point substantially midway of the length of the blade and narrowest adjacent the tip thereof.

MARSHALL A. SMITH, Jr.